United States Patent
Asati

(10) Patent No.: US 7,684,411 B2
(45) Date of Patent: *Mar. 23, 2010

(54) APPARATUS FOR LIMITING VPNV4 PREFIXES PER VPN IN AN INTER-AUTONOMOUS SYSTEM ENVIRONMENT

(75) Inventor: Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/124,862

(22) Filed: May 21, 2008

(65) Prior Publication Data

US 2008/0219270 A1    Sep. 11, 2008

Related U.S. Application Data

(63) Continuation of application No. 11/096,649, filed on Apr. 1, 2005, now Pat. No. 7,385,988.

(60) Provisional application No. 60/657,238, filed on Feb. 28, 2005.

(51) Int. Cl.
  *H04L 12/28* (2006.01)
  *H04L 12/56* (2006.01)
(52) U.S. Cl. .................................. 370/395.53
(58) Field of Classification Search ............... 370/395, 370/241, 254, 392, 465, 401, 351, 408, 238, 370/252; 709/238, 242
See application file for complete search history.

(56) References Cited

U.S. PATENT DOCUMENTS

| | | | |
|---|---|---|---|
| 7,385,988 B2* | 6/2008 | Asati ................. | 370/395.53 |
| 7,447,167 B2* | 11/2008 | Nadeau et al. ........ | 370/254 |
| 2003/0152211 A1 | 8/2003 | Kruger et al. | |
| 2004/0037296 A1 | 2/2004 | Kim et al. | |
| 2004/0081154 A1* | 4/2004 | Kouvelas .............. | 370/392 |
| 2004/0090913 A1 | 5/2004 | Scudder | |
| 2005/0025059 A1* | 2/2005 | Rajan et al. ........... | 370/238 |
| 2006/0036848 A1 | 2/2006 | Brown et al. | |
| 2006/0133265 A1 | 6/2006 | Lee | |
| 2006/0198322 A1 | 9/2006 | Hares | |

OTHER PUBLICATIONS

Asati, Rajiv, Method and Apparatus for Limiting VPNv4 Prefixes Per VPN in an Inter-Autonomous System Environment, U.S. Appl. No. 11/096,649, filed Apr. 1, 2005.

Behringer, Cisco Systems, Inc., "Analysis of the Security of BGP/MPLS IP VPNs; draft-behringer-MPLS-secutiry-10.txt," IETF Standard Working Draft, Internet Engineering Task Force, IETF, Ch. No. 10, Oct. 21, 2004.

* cited by examiner

*Primary Examiner*—Hong Cho
*Assistant Examiner*—Prenell P Jones
(74) *Attorney, Agent, or Firm*—BainwoodHuang

(57) ABSTRACT

An apparatus for limiting Virtual Private Network (VPNv4) prefixes per VPN in an inter-autonomous system environment are presented. A limit on the number of VPNv4 routes per VPN for a Route Distributor (RD) or a group of RDs associated with a VPN is defined, at an Autonomous System Border Router (ASBR). When the number of received routes at the ASBR exceeds the limit, then a soft notification is sent to a neighboring ASBR and routes exceeding the limit are discarded at the ASBR.

14 Claims, 4 Drawing Sheets

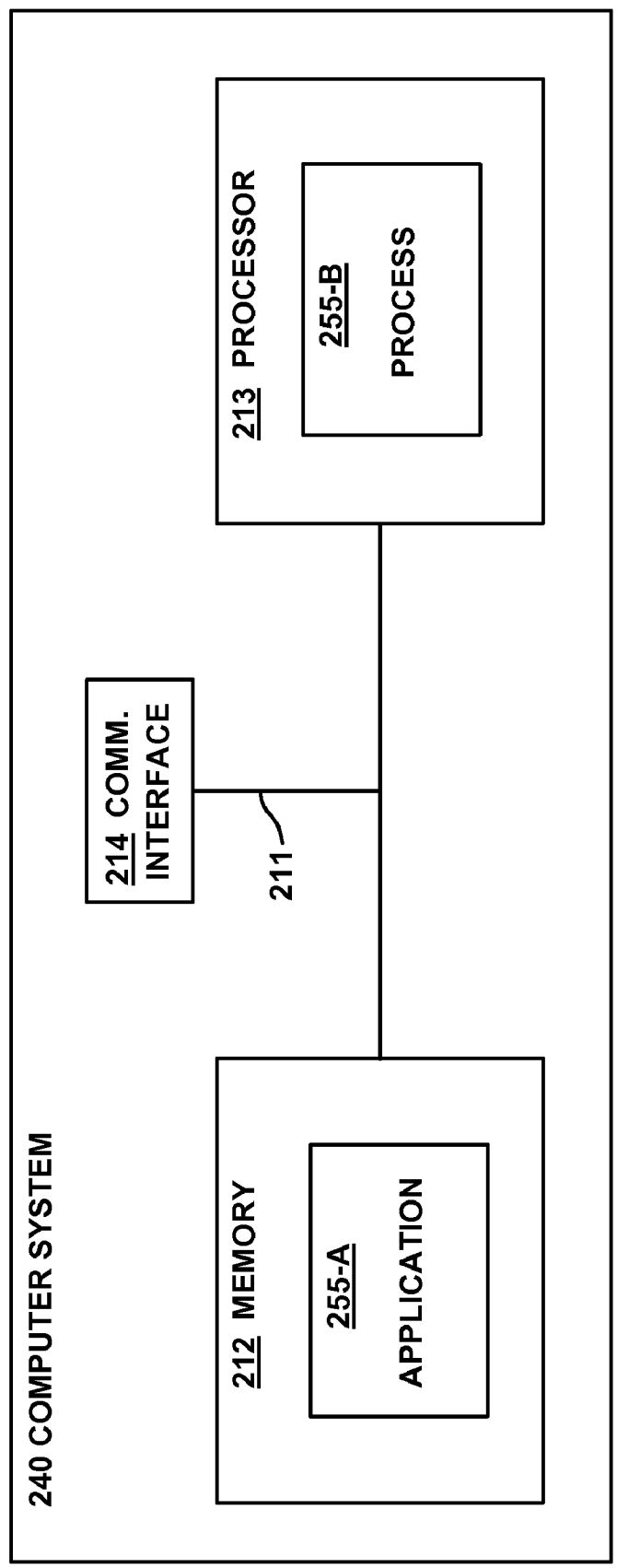

US 7,684,411 B2

APPARATUS FOR LIMITING VPNV4 PREFIXES PER VPN IN AN INTER-AUTONOMOUS SYSTEM ENVIRONMENT

CROSS REFERENCE TO RELATED APPLICATIONS

This patent application is a Continuation of U.S. patent application Ser. No. 11/096,649 filed on Apr. 1, 2005, entitled, "METHOD AND APPARATUS FOR LIMITING VPNv4 PREFIXES PER VPN IN AN INTER-AUTONOMOUS SYSTEM ENVIRONMENT," which claims the benefit of U.S. Provisional Patent Application No. 60/657,238, filed on Feb. 28, 2005, the contents and teachings of which are hereby incorporated by reference in their entirety.

BACKGROUND

Computer networks typically provide a physical interconnection between different computers to allow convenient exchange of programs and data. A plurality of connectivity devices, such as switches and routers, interconnect each user computer connected to the network. The connectivity devices maintain routing information about the computers and perform routing decisions concerning message traffic passed between the computers via the connectivity devices. Each connectivity device, or router, corresponds to a network routing prefix indicative of the other computers, which it has direct, or indirect access to. Therefore, data routed from one computer to another follows a path through the network defined by the routers between the two computers.

The routers define nodes in a network, and data travels between the nodes in a series of so-called "hops" over the network. Since each router is typically connected to multiple other routers, there may be multiple potential paths between given computers. Typically, the routing information is employed in a routing table in each router, which is used to determine a path to a destination computer or network. The router makes a routing decision, using the routing table, to identify the next "hop," or next router, to send the data to in order for it to ultimately reach the destination computer.

Networks can include one or more autonomous systems (ASs). An AS is a network or group of networks under a common administration and with common routing policies. Some service providers fear security issues while deploying Inter-Autonomous System (AS) deployment. Although "Inter-AS Option B" Border Gateway Protocol (BGP) Virtual Private Network (VPN) v4 peering between Autonomous System Border Routers (ASBRs) is considered safer than that of the "Inter-AS Option C", the secured configuration (within BGP) is still highly required to protect the provider infrastructures.

SUMMARY

Conventional mechanisms such as those explained above suffer from a variety of drawbacks. One such drawback is that in conventional systems, almost all Inter-AS providers limit the total number of VPNv4 prefixes received from the neighbor ASBR (in the remote AS) to protect their routers' resources. The current available mechanisms do not safeguard one (Inter-AS) VPN causing the other (Inter-AS) VPN to be compromised. In other words, in the current BGP framework, it is possible that one (Inter-AS) VPN customer can cause the other (Inter-AS) VPN customers' routes to be sacrificed i.e. dropped by the neighbor ASBR. This is because the current mechanism in BGP only provides the limit on the aggregate number of VPNv4 prefixes received from the peer ASBR. ASBRs in an Inter-AS environment in Option B (or Route-Reflectors in Option C) usually don't have any VPN Routing/Forwarding instances (VRFs) configured. A VRF defines the VPN membership of a customer site attached to a PE router. A VRF includes an IP routing table, a derived Express Forwarding table, a set of interfaces that use the forwarding table, and a set of rules and routing protocol parameters that control the information that is included into the routing table. Since ASBRs do not have VRFs configured, the ASBRs do not have visibility to the specific VPN customer's routes, which are required in order to make intelligent route limiting determinations. The invention is applicable to both Inter-AS Option B and Option C.

Embodiments of the invention significantly overcome such deficiencies and provide mechanisms and techniques that limit VPNv4 prefixes per VPN in an inter-autonomous system environment. Accordingly, one improperly functioning VPN within the inter-AS environment does not impact the other VPNs (as it does in conventional systems). Other VPNs will experience no loss of routing information across the ASs.

In a particular embodiment of a method for limiting VPNv4 prefixes per VPN in an inter-autonomous system environment, the method includes defining, at an Autonomous System Border Router (ASBR), a limit on the number of VPNv4 routes per VPN for one or all the Route Distributor (RD) values associated with a VPN. An RD (RD) is similar to a VRF. The method further includes determining if a number of received VPNv4 routes at the ASBR exceed the limit for a specific VPN. When the limit is exceeded, a soft notification is sent to a neighboring ASBR and routes exceeding the limit are discarded at the ASBR. The session between ASBRs is maintained.

Other embodiments include a computer readable medium having computer readable code thereon for limiting VPNv4 prefixes per VPN in an inter-autonomous system environment. The medium includes instructions for defining, at an ASBR, a limit on the number of VPNv4 routes per VPN for one or all RD values associated with a VPN. The medium further includes instructions for determining if a number of received routes at the ASBR exceed the limit. The medium additionally includes instructions for sending a soft notification to a neighboring ASBR when the number of received routes exceeds the limit and instructions for discarding routes exceeding the limit at the ASBR. The medium may further include instructions such that the session between ASBRs is maintained.

Another embodiment comprises a network system including at least one VPN, at least one Provide Edge (PE) router in communication with the at least one VPN, and a first Autonomous System Border Router (ASBR) in communication with the at least one PE. The first ASBR includes a limit on the number of VPNv4 routes per VPN for a RD associated with the at least one VPN. The first ASBR determines if a number of received routes at the first ASBR from the second ASBR exceed the limit. The first ASBR sends a notification (preferably a soft notification including relevant RD values) to the second ASBR when the number of received routes exceeds the limit. The first ASBR discards routes exceeding the limit when the number of received routes exceeds said limit. The session between the first and second ASBRs is maintained.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a mechanism to limit VPNv4 prefix per VPN in an inter-autonomous system environment as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a mechanism to limit VPNv4 prefix per VPN in an inter-autonomous system environment as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates an example computer system architecture for a computer system that provides limiting Virtual Private Network (VPNv4) prefixes per VPN in an inter-autonomous system environment in accordance with embodiments of the invention.

DETAILED DESCRIPTION

Figure 1:
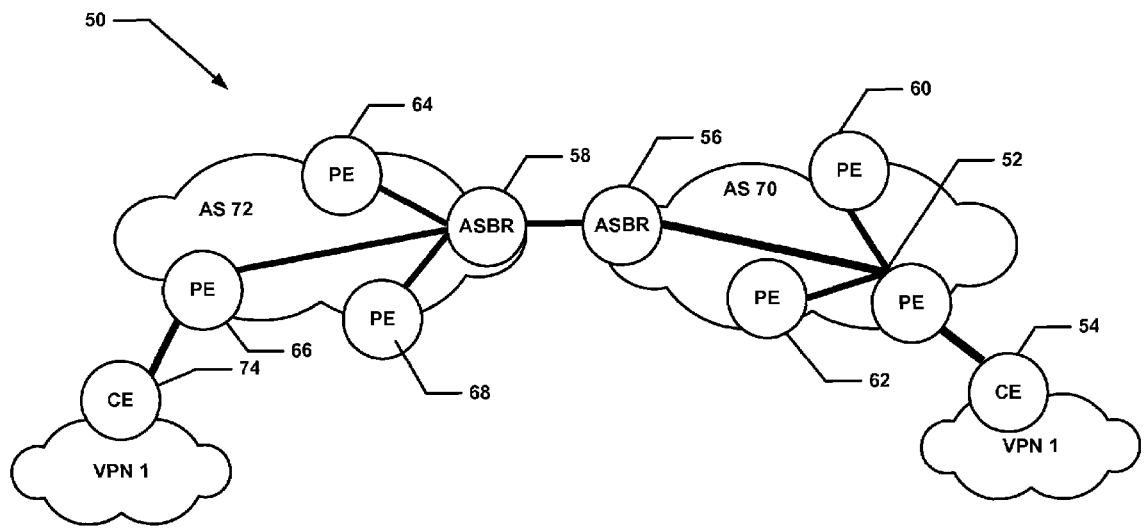
FIG. 1 illustrates a block diagram of an Inter-AS VPN deployment scenario.

Embodiments of the present invention provide an ASBR with the ability to limit the number of VPNv4 routes which are received from a neighbor ASBR (i.e. MP-eBGP peer). This is achieved by providing a system in which a "prefix-limit per RD" is defined within the BGPVPNv4 address-family. The system also has the ability to send a BGP soft notification if the prefix-limit is exceeded even for a single RD or group of RDs. The system requires modifications in the existing soft-notify operation/message to include the RD value and has the ability to define the "VPNv4 route limit per VPN" by including the possible RD values associated with a given VPN. The VPNv4 routes are not limited to a single RD and can be applied to a group of RDs.

There are three "Intra-VPN" scenarios within a framework that provide this functionality. A first scenario involves a unique RD per VPN. In this first scenario all the PEs are configured with the same VRF (i.e. RD) for that VPN. In a second scenario utilizes a unique RD per PE per VPN. In this scenario each PE is configured with the different VRFs (i.e. RDs) for that VPN. A third scenario involves a unique RD per PE per Interface per VPN. In such a scenario each Interface is configured with the different VRFs (i.e. RDs) for the same VPN. Hence, a VPN could include multiple RDs (multiple VRFs in actual deployment). Nonetheless, the characteristics of the VPN wouldn't change as it would still remain the "Intra-VPN" based on the import/export policies (RT values).

When the VPN becomes an Inter-ASVPN, a first ASBR advertises to a second ASBR the relevant VPNv4 routes belonging to that VPN, which correspond to the routes from all the constituting VRFs. When Inter-AS peering agreement takes place, the providers negotiate/share the number of VPNv4 routes "per Inter-ASVPN" and the relevant RD values for each of those Inter-AS VPNs.

The Inter-AS providers, in conventional deployments, negotiate on the "total number of VPNv4 routes" limit from the other provider. By way of the present invention the inter-AS providers further negotiate the number of VPNv4 routes "per Inter-ASVPN" and the relevant RD values for each of those Inter-AS VPNs as well, in order to better protect the relevant VPNs.

An example wherein an ASBR (ASBR2) deploy an inbound max-prefix limit per RD or a group of RDs towards the eBGP neighbor ASBR1 as shown in the sample configuration below:

```
ASBR2#
!
router bgp <ASN2>
!
neighbor <ASBR1> remote-AS <ASN1>
!
address-family vpnv4
    neighbor <ASBR1> max-prefix rd-list 20 inbound
!
rd-list 20 permit 10
    max-prefix 400
    rd 3000:1
rd-list 20 permit 20
    max-prefix 100
```

-continued

```
    rd 3000:3 3000:4
 rd-list 20 permit 30
    max-prefix 1500
    rd 3000:10 3000:11 3000:12
!
```

If the VPNv4 prefix-limit is exceeded for a given ACL, then the exceeded routes pertaining to that RD (or those RDs) are discarded. BGP would also convey this occurrence to the peer(s) via the soft-notify message which would include the relevant RD value(s). The peer will then generate a console message, which could prompt for other actions.

The BGP soft-notification message can notify a peer of an error-condition for a particular AFI/SAFI and soft-reset the AFI/SAFI, without terminating the BGP session and without impacting the other AFI/SAFIs exchanged with the peer. While a standard (or hard) notification message resets the peering session and terminates the connection, a BGP soft-notification message is a mechanism to notify a remote peer of an error-condition or an event without resetting or terminating the BGP session. The purpose of this message is to provide the ability to soft-reset a particular AFI/SAFI without disrupting other BGP AFI/SAFIs or sections.

When a peer receives a BGP soft-notification Message, it will take an action based on the Type-code contained in the message. The sending peer will also take an action after it has sent the soft-notification out to its peer. Accordingly, by way of the soft notification, the MP-eBGP session between the ASBRs is not torn down, thereby preserving the routing information for rest of the (behaving) VPNs, thus providing the protection.

Furthermore, a threshold value such as 80% of the limit could be configured in the above context so that the warning could be generated (without discarding the routes) before reaching the limit (and then discarding the routes).

Although a VPNv4 route with a given RD may be imported into multiple VRFs (constituting multiple VPNs), this is acceptable. As long as the "Inter-AS VPN" include the constituting RD values, it doesn't matter which VRFs import the exchanged VPN routes.

This arrangement is advantageous since if one Inter-AS VPN customer (comprising one or more VRFs i.e. RD values) starts advertising more routes than permitted at the neighbor ASBR, then the VPNv4 routes associated with other Inter-AS VPNs will not be impacted. Only the misbehaving Inter-AS VPN's routes (beyond the configured limit) are discarded at the ASBR, resulting in no loss to either the BGP session or the other VPNs. This provides further security to the Inter-AS VPNs and isolate the behaving Inter-AS VPNs from the misbehaving ones.

Referring now to FIG. 1, a particular embodiment of a network system 50 is shown where a first VPN (i.e., VPN1) and CE router 54 are in communication with a first AS 70. First AS 70 also includes PE 52, PE 60, PE 62 and ASBR 56. A second AS 72 is in communication with first AS 70. Second AS 72 includes an ASBR 58 in communication with ASBR 56 of first AS 70. ASBR 58 is also in communication with PE 64, PE 66 and PE 68. PE 66 is also in communication with router CE 74 as part of the first VPN.

In traditional routing architectures, internal routes include all of a provider's internal links and interfaces. These internal routes are exchanged with other routers in the service provider's network using an interior gateway protocol (IGP). All routes learned from customer sites are learned either dynamically or statically. In a provider network, the PE routers maintain such customer routes within the relevant VRF routing table.

In the scenario shown in FIG. 1, The PE routers within an AS use MP-IBGP to distribute labeled VPNv4 routes to an ASBR. The ASBR then uses MP-EGBP to distribute labeled VPNv4 routes to the ASBR in the neighboring AS. In the present invention, when ASBR 56 begins a peering session with ASBR 58, a limit regarding the number of VPNv4 routes the ASBR will receive, is negotiated. Routing updates are then exchanged between ASBR 56 and ASBR 58. When the first VPN becomes an Inter-AS VPN, a first ASBR advertises to a second ASBR the relevant VPNv4 routes belonging to that VPN, which correspond to the routes from all the constituting VRFs. When Inter-AS peering agreement takes place, the providers negotiate/share the number of VPNv4 routes "per Inter-AS VPN" and the relevant RD values for each of those Inter-AS VPNs.

In network system 50, ASBR 56 has been provided with a limit on the number of VPNv4 routes for VPN 1 for an RD associated with VPN 1. In operation, ASBR 56 determines if a number of received routes exceeds the limit. When this occurs, ASBR 56 sends a notification to ASBR 58. ASBR 56 discards routes exceeding the limit when the number of received routes exceeds said limit. ASBR 56 may also include a threshold value lower than the limit, wherein ASBR 56 generates a warning when the threshold value is reached. The notification is a soft notification, and includes the relevant RD values.

The PE routers of AS 70, namely PE routers 52, 60 and 62, may be configured in various alternate ways as part of the presently disclosed system for of limiting VPNv4 prefixes per VPN in an inter-autonomous system environment. In one embodiment all the PE routers per VPN are configured with a unique RD. Thus, PEs 52, 60 and 62 are all configured with a unique RD, while other PEs such as PE 64, 66, 68 may be configured with a different RD.

In another embodiment, each PE router is configured with a unique RD. Thus, PE 52 is configured with a unique RD, PE 60 is configured with another unique ID and PE 62 is configured with an RD different from that of PE 52 and PE 60.

In yet another embodiment, each interface of PE router is configured with a unique RD. Thus, each interface of PE 52 is configured with a unique RD, each interface of PE 60 is configured with a unique RD and each interface of PE 62 is configured with a unique RD.

Figure 2A:
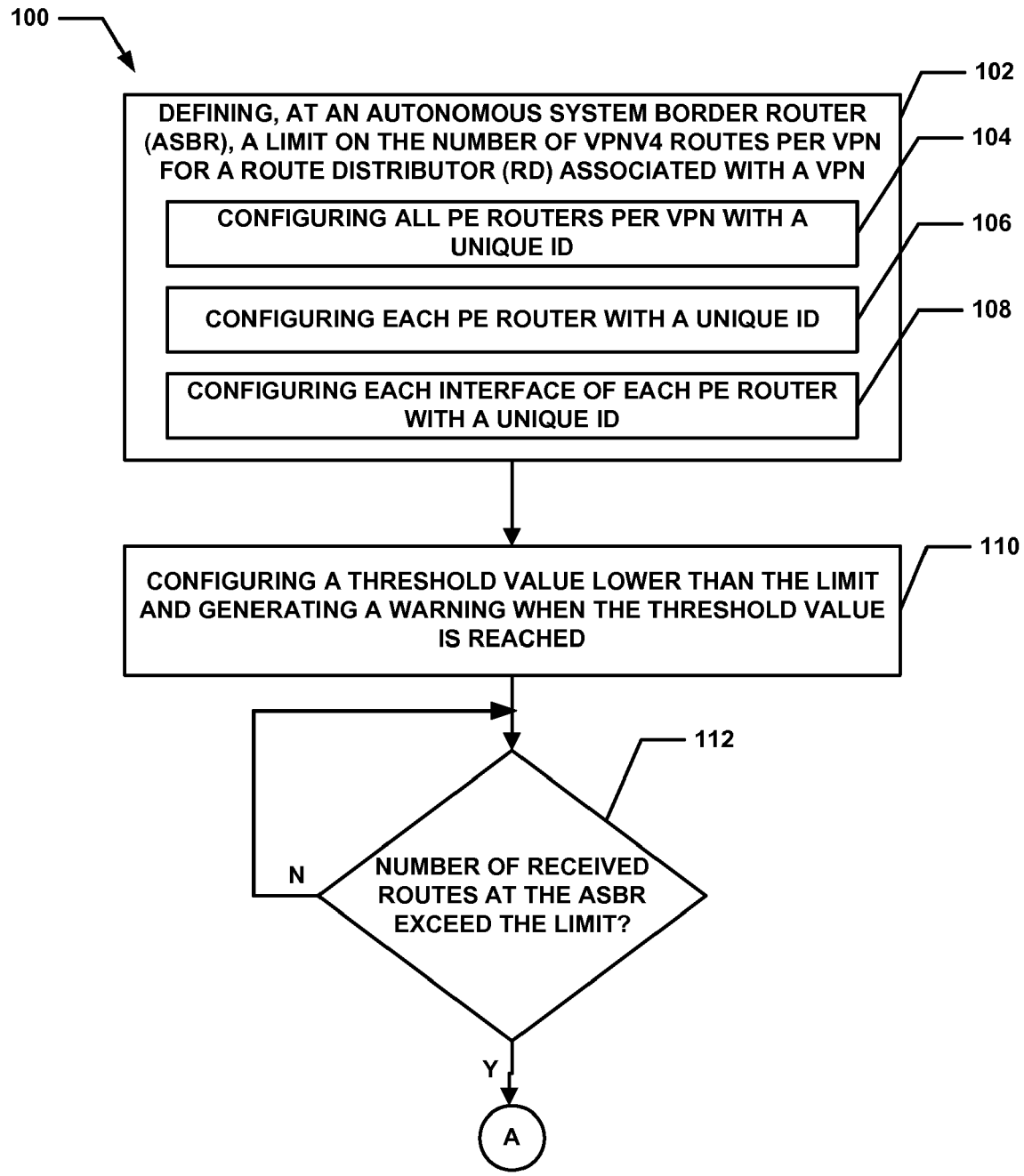
FIGS. 2A and 2B show a flow chart of a particular embodiment for limiting Virtual Private Network (VPNv4) prefixes per VPN in an inter-autonomous system environment.
Figure 2B:
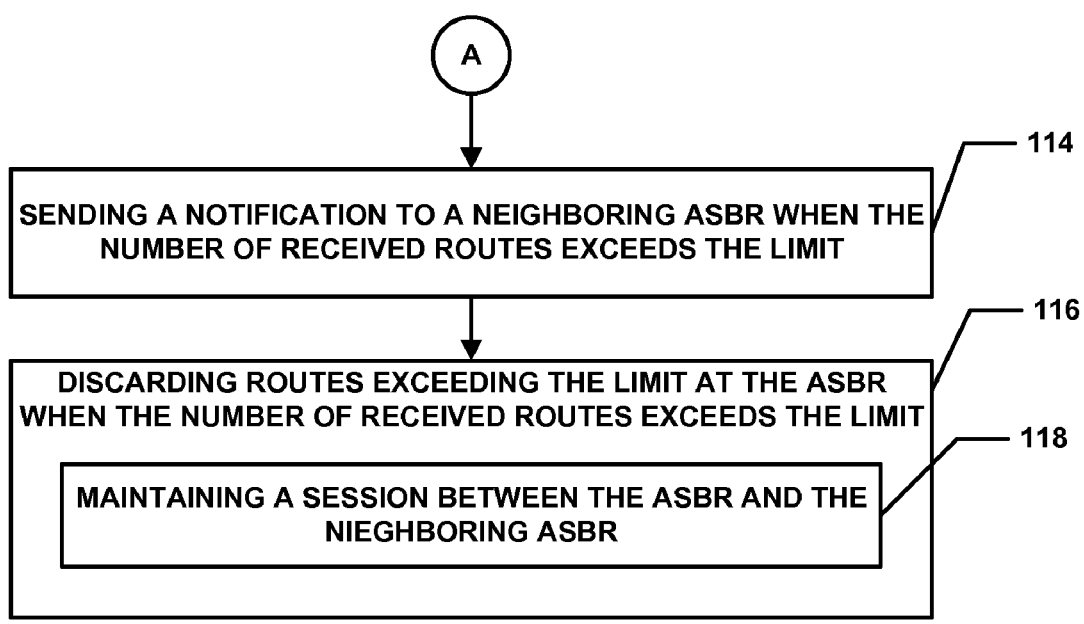

A flow chart of the presently disclosed method is depicted in FIGS. 2A and 2B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a flow chart of a particular embodiment of a method 100 of limiting VPN v4 prefixes per VPN in an inter-autonomous system environment is shown. The method 100 begins with processing block 102, wherein the action of defining, at an ASBR, a limit on the number of VPNv4 routes per VPN for a RD associated with a VPN is shown.

Following execution of processing block 102, one or more of processing blocks 104, 106 and 108 may be executed. In processing block 104, all the PE routers within a VPN are configured with the same unique RD. In processing block 106, each PE router within a VPN is configured with a unique RD. In processing block 108, each interface of each the PE router within a VPN are configured with a unique RD.

In processing block 110, a threshold value may be configured regarding the limit on the number of VPNv4 routes per VPN for a Route Distributor (RD) associated with a VPN. The threshed value is lower than the limit and is used for the generating of a warning when the threshold value is reached.

In decision block 112, a determination is made regarding whether a number of received routes at the ASBR exceed the limit defined in processing block 102. When the limit is exceeded, processing continues with processing block 114.

In processing block 114, when the limit is exceeded a (soft) notification is sent to a neighboring ASBR. In processing block 116, routes exceeding the limit are discarded at the ASBR when the number of received routes exceeds the limit. As shown in processing block 118, when the routes are discarded, the session between the ASBR and the neighboring ASBR is maintained, thereby preserving the routing information for the rest of the Inter-AS VPNs.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals.

What is claimed is:

1. An apparatus for limiting Virtual Private Network (VPN) v4 prefixes per VPN in an inter-autonomous system environment, the apparatus comprising:
a communications interface, the communications interface connecting to a first autonomous system and to a second autonomous system;
a memory, the memory storing an application; and
a processor which is constructed and arranged to run the application stored in memory, and when running the application is operative to:
define a limit on the number of VPNv4 routes per VPN for a Route Distributor (RD) associated with a VPN;
determine if a number of received routes at the communications interface exceeds the limit;
send, across the communications interface, a soft notification to a neighboring Autonomous System Border Router (ASBR) when the number of received routes exceeds the limit; and
discard routes exceeding the limit when the number of received routes exceeds the limit.

2. The apparatus of claim 1 wherein the processor, when running the application is further operative to configure all Provider Edge routers per VPN with a unique RD.

3. The apparatus of claim 1 wherein the processor, when running the application is further operative to configure each Provider Edge router with a unique RD.

4. The apparatus of claim 1 wherein the processor, when running the application is further operative to configure each interface of each Provider Edge router with a unique RD.

5. The apparatus of claim 1 wherein the processor, when running the application is further operative to maintain a session with the neighboring ASBR when routes are discarded.

6. The apparatus of claim 1 wherein the processor, when defining the limit on the number of VPNv4 routes per VPN, is constructed and arranged to configure a threshold value lower than the limit, and generate a warning when the threshold value is reached.

7. The apparatus of claim 1 wherein the processor, when sending a soft notification, is constructed and arranged to send a soft notification including relevant RD values.

8. An apparatus for limiting Virtual Private Network (VPN) v4 prefixes per VPN in an inter-autonomous system environment, the apparatus comprising:
communications means, the communications means for communicating with a first autonomous system and for communicating with a second autonomous system;
means for:
defining a limit on the number of VPNv4 routes per VPN for a Route Distributor (RD) associated with a VPN;
determining if a number of received routes at the communications means exceeds the limit;
sending, across the communications means, a soft notification to a neighboring Autonomous System Border Router (ASBR) when the number of received routes exceeds the limit; and
discarding routes exceeding the limit when the number of received routes exceeds the limit.

9. The apparatus of claim 8 wherein the apparatus further comprises means for configuring all Provider Edge routers per VPN with a unique RD.

10. The apparatus of claim 8 wherein the apparatus further comprises means for configuring each Provider Edge router with a unique RD.

11. The apparatus of claim 8 wherein the apparatus further comprises means for configuring each interface of each Provider Edge router with a unique RD.

12. The apparatus of claim 8 wherein the apparatus further comprises means for maintaining a session with the neighboring ASBR when routes are discarded.

13. The apparatus of claim 8 wherein the means for defining the limit on the number of VPNv4 routes per VPN includes means for configuring a threshold value lower than the limit, and generating a warning when the threshold value is reached.

14. The apparatus of claim 8 wherein the means for sending the soft notification includes means for sending a soft notification including relevant RD values.

* * * * *